United States Patent
Jeanroy

(10) Patent No.: US 8,991,249 B2
(45) Date of Patent: *Mar. 31, 2015

(54) VIBRATING GYROSCOPE AND TREATMENT PROCESS

(75) Inventor: Alain Jeanroy, Paris (FR)

(73) Assignee: Sagem Defense Securite, Paris (FR)

( * ) Notice: Subject to any disclaimer, the term of this patent is extended or adjusted under 35 U.S.C. 154(b) by 225 days.

This patent is subject to a terminal disclaimer.

(21) Appl. No.: 13/478,086

(22) Filed: May 22, 2012

(65) Prior Publication Data

US 2012/0297875 A1 Nov. 29, 2012

Related U.S. Application Data

(60) Provisional application No. 61/489,070, filed on May 23, 2011.

(51) Int. Cl.
*G01C 19/56* (2012.01)
*G01C 19/5691* (2012.01)

(52) U.S. Cl.
CPC .................................. *G01C 19/5691* (2013.01)
USPC ..................................... 73/504.13; 73/504.12

(58) Field of Classification Search
CPC ........... G01C 19/5691; G01C 19/5684; G01C 19/5677; G01C 19/5719; G01C 19/567; G01C 19/56
USPC .............................. 73/504.13, 504.12, 504.04
See application file for complete search history.

(56) References Cited

U.S. PATENT DOCUMENTS

| | | | | |
|---|---|---|---|---|
| 4,157,041 A | * | 6/1979 | Loper et al. | 73/504.13 |
| 4,644,793 A | * | 2/1987 | Church | 73/504.13 |
| 6,640,630 B1 | * | 11/2003 | de Salaberry | 73/504.13 |
| 7,123,111 B2 | * | 10/2006 | Brunson et al. | 331/116 M |
| 7,281,425 B2 | * | 10/2007 | Chikovani et al. | 73/504.13 |
| 7,281,426 B1 | * | 10/2007 | Chikovani et al. | 73/504.13 |
| 7,617,727 B2 | * | 11/2009 | Watson | 73/504.13 |
| 2010/0154542 A1 | * | 6/2010 | Okon et al. | 73/504.12 |
| 2013/0269433 A1 | * | 10/2013 | Jeanroy | 73/504.12 |

FOREIGN PATENT DOCUMENTS

| | | |
|---|---|---|
| FR | 2717267 | 9/1995 |
| FR | 2 723 635 | 2/1996 |
| FR | 2814234 | 3/2002 |
| FR | 2 946 135 | 12/2010 |
| GB | 2 272 054 | 5/1994 |

(Continued)

OTHER PUBLICATIONS

French Preliminary Search Report Based on Application No. 1005072 Mailed August 11, 2011.

*Primary Examiner* — Helen Kwok
(74) *Attorney, Agent, or Firm* — Miles & Stockbridge PC

(57) ABSTRACT

A vibrating gyroscope has a base and a resonator. The resonator includes a body of generally cylindrical shape terminating in a face. The resonator is capable of vibrating according to a first vibration mode having antinodes distributed on n axes, and a second vibration mode having antinodes distributed on n other axes. The face of the resonator has two piezoelectric assemblies on each axis of the first and of the second vibration modes. Each piezoelectric assembly has at least one piezoelectric element capable of exciting the resonator in vibration and at least one piezoelectric element capable of detecting vibrations of the resonator at the same time.

18 Claims, 7 Drawing Sheets

(56) References Cited

FOREIGN PATENT DOCUMENTS

| | | |
|---|---|---|
| GB | 2 310 284 | 8/1997 |
| GB | 2 424 706 | 10/2006 |
| JP | 2009092595 | 4/2009 |
| WO | 2010/139893 | 12/2010 |

* cited by examiner

VIBRATING GYROSCOPE AND TREATMENT PROCESS

CROSS REFERENCE TO RELATED APPLICATION

This application claims priority to U.S. Provisional Application No. 61/489,070, filed May 23, 2011, the content of which is incorporated herein by reference in its entirety.

BACKGROUND

1. Field of the Invention

The invention relates to a vibrating gyroscope.

2. Description of Related Art

Vibrating gyroscopes are currently used in numerous fields, especially because of their solidity, their reduced electrical consumption, and their rapid execution.

These gyroscopes comprise a resonator which can take various forms, such as a bell or a tuning fork.

The invention relates more particularly to resonators comprising a body of generally cylindrical shape.

The axis z is conventionally designated as the axis of the cylinder, the axes x, y being arranged in the plane orthogonal to the axis z.

It is known that such a resonator in vibration deforms itself preferably elliptically, with four vibration antinodes regularly arranged over the circumference of the cylinder in the plane x, y. A first vibration mode 53, 57 of the resonator is illustrated in FIG. 1, at two given instants, relative to its rest state 54. The resonator passes from ellipse 53 to ellipse 57 at the end of a semi-period, but this is still the same vibration mode.

Any rotation of the gyroscope about the axis z generates Coriolis forces which have a tendency to cause offset in rotation of vibration antinodes about the circumference of the cylinder. Piezoelectric detection elements, placed at the level of the vibration antinodes, measure a signal, the variation of which determines the angular rotation speed and/or the angle of rotation about the axis z.

It is known that vibration antinodes correspond to the maxima in amplitude of the vibration of the resonator.

By way of illustration, it is evident in FIG. 1 that rotation of the resonator causes secondary vibration in elliptical mode 52, 58 whereof the principal axes $x_1$, $y_1$ are located at 45° of the axes x, y. Vibration passes from ellipse 52 to ellipse 58 at the end of a semi-period.

The signal measured by the piezoelectric detection elements at the level of these axes especially determines the angular rotation speed.

More generally, the resonator 3 is capable of vibrating according to couples of modes whereof the antinodes are distributed on n axes, with n a whole number greater than or equal to two. Each of the couples of modes for each value of n has a sensitivity to the speed of rotation of the resonator and can be used to make a gyroscope. The case of n=2 corresponds to elliptical vibration modes, as illustrated in FIG. 1.

In general, gyroscopes comprise four piezoelectric detection elements for maintaining the vibration of said resonator, and four other piezoelectric elements for measuring the vibration signal of the resonator. These eight elements are most often arranged uniformly about the resonator (four on axes x, y and four on axes $x_1$, $y_1$).

It is known that parasite vibration modes appear in cylindrical resonators. These are for example the modes shown in FIG. 2: vibration mode 55, said drum mode, and vibration mode 56, said flexion mode.

Detection solutions of vibration modes proposed to date do not reject these parasite modes.

Therefore a solution for improving the devices of the prior art should be proposed.

SUMMARY

For this purpose, the present invention proposes a vibrating gyroscope comprising a base, a resonator, comprising a body of generally cylindrical shape terminating in a face, the resonator being capable of vibrating according to a first vibration mode comprising antinodes distributed on n axes, and a second vibration mode comprising antinodes distributed on n other axes, said gyroscope being characterised in that the face of the resonator comprises on each axis of the first and of the second vibration modes two piezoelectric assemblies, each piezoelectric assembly at the same time comprising at least one piezoelectric element capable of exciting the resonator in vibration and at least one piezoelectric element capable of detecting vibrations of the resonator.

DETAILED DESCRIPTION OF A PREFERRED EMBODIMENT

Figure 1:
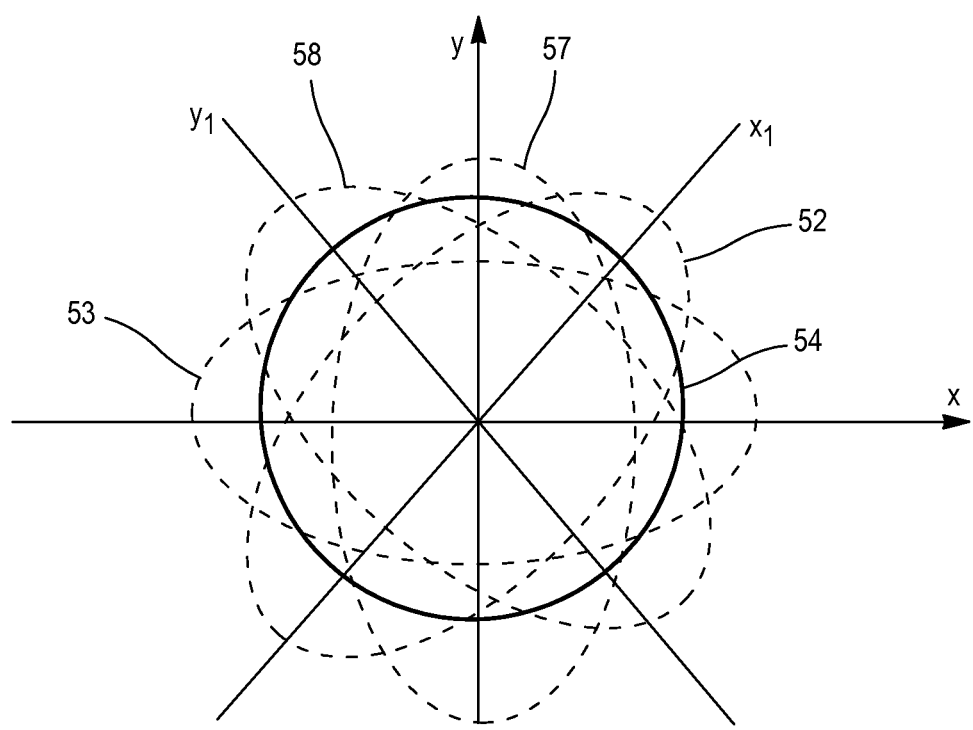
FIG. 1 is an illustration of vibration modes of a gyroscope with cylindrical resonator.

The present invention is advantageously completed by the following characteristics, taken singly or in any of their technically possible combinations:

- the resonator is capable of vibrating according to a first vibration mode comprising antinodes distributed on two axes, and a second vibration mode comprising antinodes distributed on two other axes, the face of the resonator comprising on each axis of the first and of the second vibration modes two piezoelectric assemblies, each piezoelectric assembly at the same time comprising at least one piezoelectric element capable of exciting the resonator in vibration and at least one piezoelectric element capable of detecting vibrations of the resonator;
- the piezoelectric assemblies are arranged on each axis of the first and of the second vibration modes, to either side of the centre of the face of the resonator;
- each assembly comprises two piezoelectric elements, a piezoelectric element capable of exciting the resonator in vibration and a piezoelectric element capable of detecting vibrations of the resonator;

the piezoelectric elements capable of exciting the resonator in vibration are arranged uniformly over the circumference of the face, and the piezoelectric elements capable of detecting vibrations of the resonator are arranged uniformly over the circumference of the face;

the piezoelectric elements of each assembly consist of distinct elements, or of zones of the same piezoelectric element;

the gyroscope further comprises vibration control and processing modules, connected to the piezoelectric elements;

the face comprises a plurality of through holes;

the openings are arranged substantially uniformly over the circumference of the face, and the piezoelectric elements are arranged between said holes.

The invention likewise proposes a treatment process in a vibrating gyroscope such as described hereinabove, comprising steps consisting of:

measuring the vibration of the resonator with the piezoelectric elements, and combining the measurements of said piezoelectric elements for rejecting parasite vibration modes appearing in the resonator.

Advantageously, the combination of measurements of the piezoelectric elements comprises the step consisting of, for each vibration mode, getting a treated signal equal to the sum of the measurements of piezoelectric elements located on the antinodes having an amplitude of a given sign, minus the sum of the measurements of piezoelectric elements located on the antinodes having an amplitude of a sign opposite the given sign, said signs being defined at a given instant of vibration, said treated signal rejecting parasite vibration modes of the resonator.

Advantageously, the process comprises step consisting of exciting in vibration the first and/or the second modes via the piezoelectric elements capable of exciting the resonator in vibration arranged on the axes of said mode, said excitation being calibrated from the measurements of piezoelectric elements capable of detecting vibrations of the resonator arranged on said axes of said mode, to execute closed-loop processing.

Figure 2:
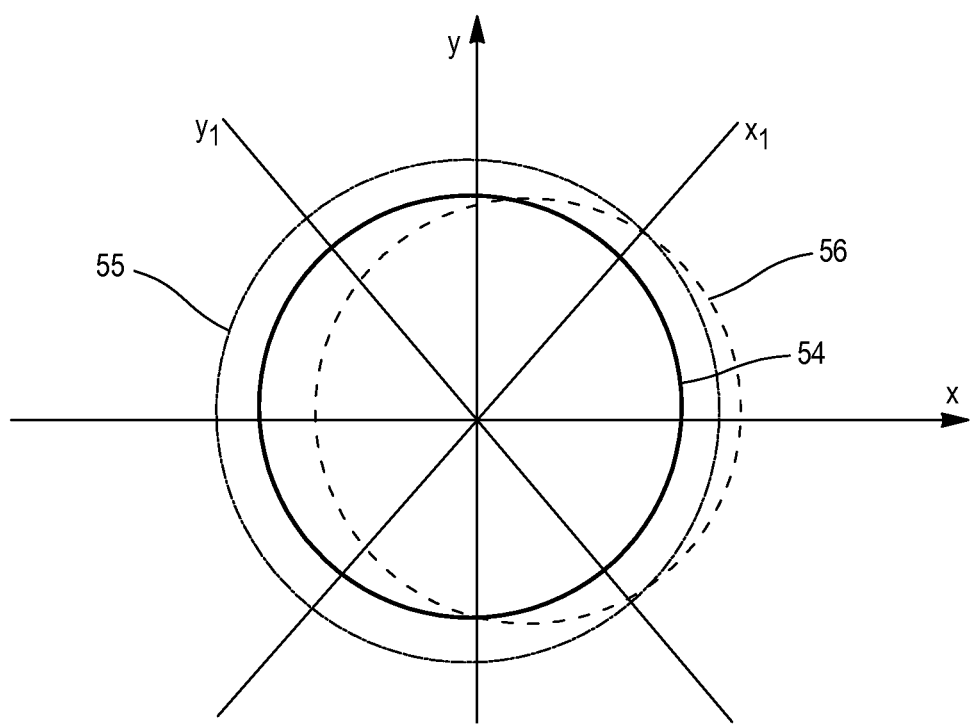
FIG. 2 is an illustration of vibration modes of a gyroscope with cylindrical resonator.
Figure 3:
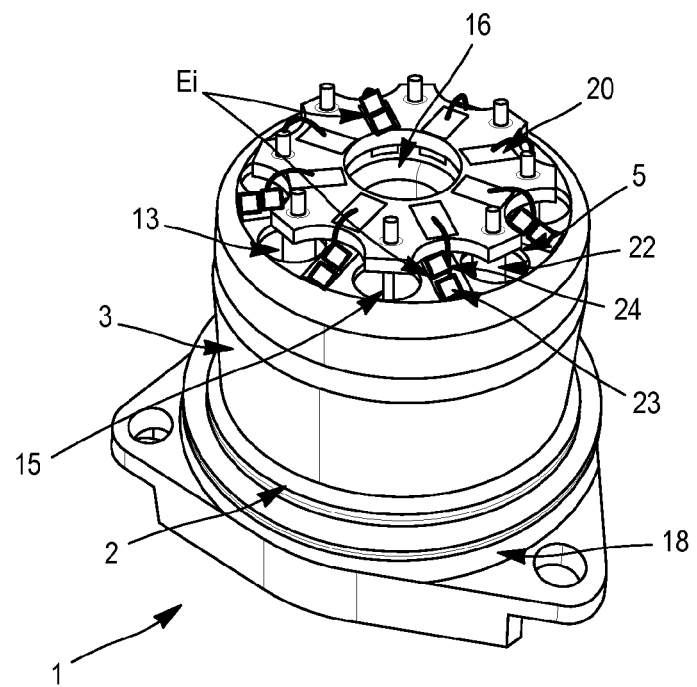
FIG. 3 is an illustration of an embodiment of a gyroscope according to the invention.
Figure 4:
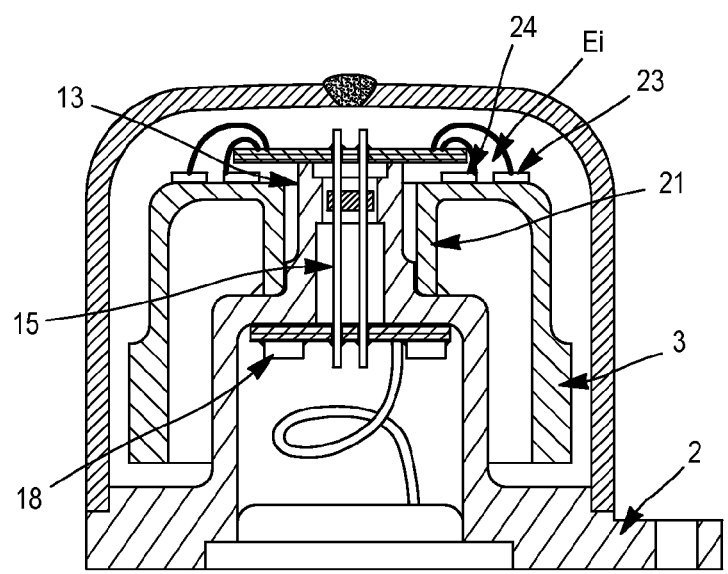
FIG. 4 is an illustration of another embodiment of a gyroscope according to the invention.
Figure 5:
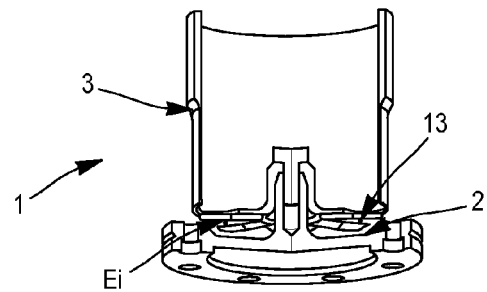
FIG. 5 is an illustration of another embodiment of a gyroscope according to the invention.
Figure 6:
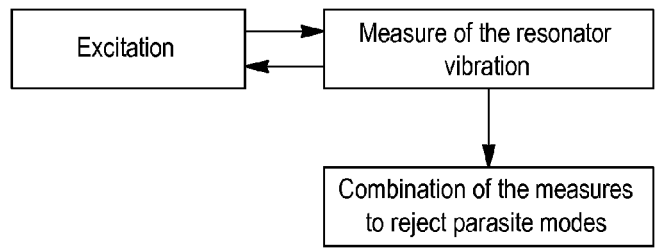
FIG. 6 is a schematic illustration of steps of a treatment process according to the invention.
Figure 7:
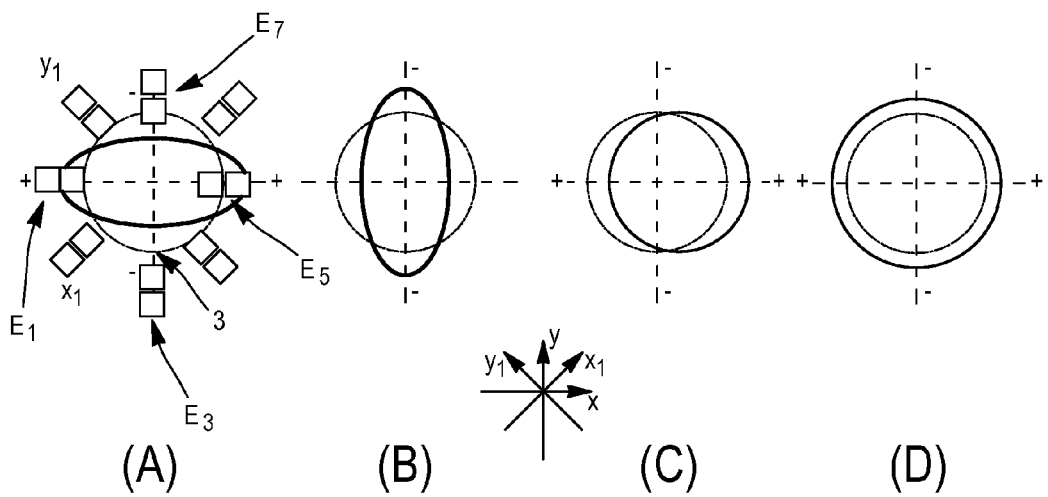
FIG. 7 is a schematic illustration of an embodiment of the processing of the vibration according to the invention.
Figure 8:
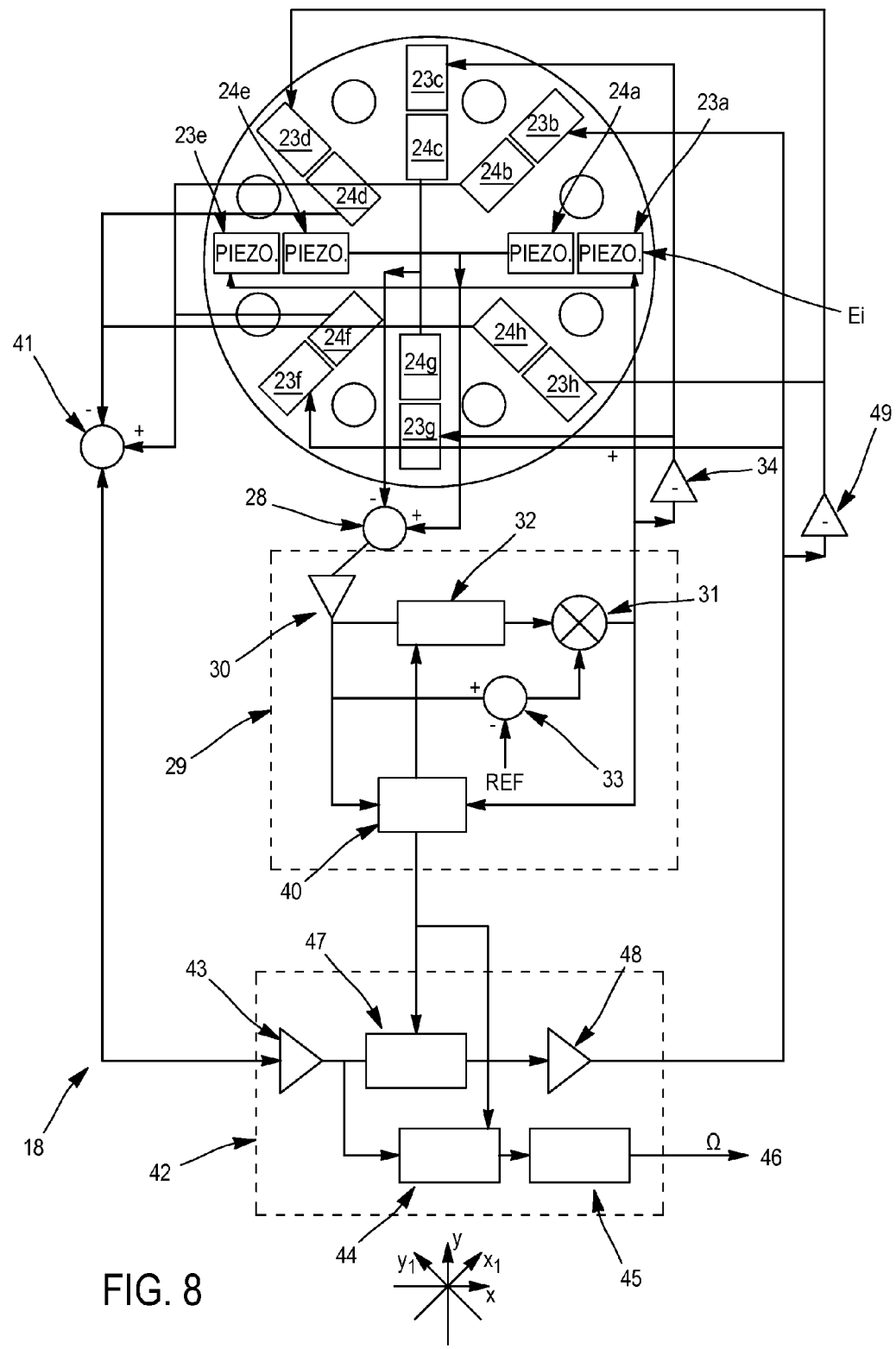
FIG. 8 is an illustration of an embodiment of the control and processing of the vibration of the resonator.
Figure 8A:
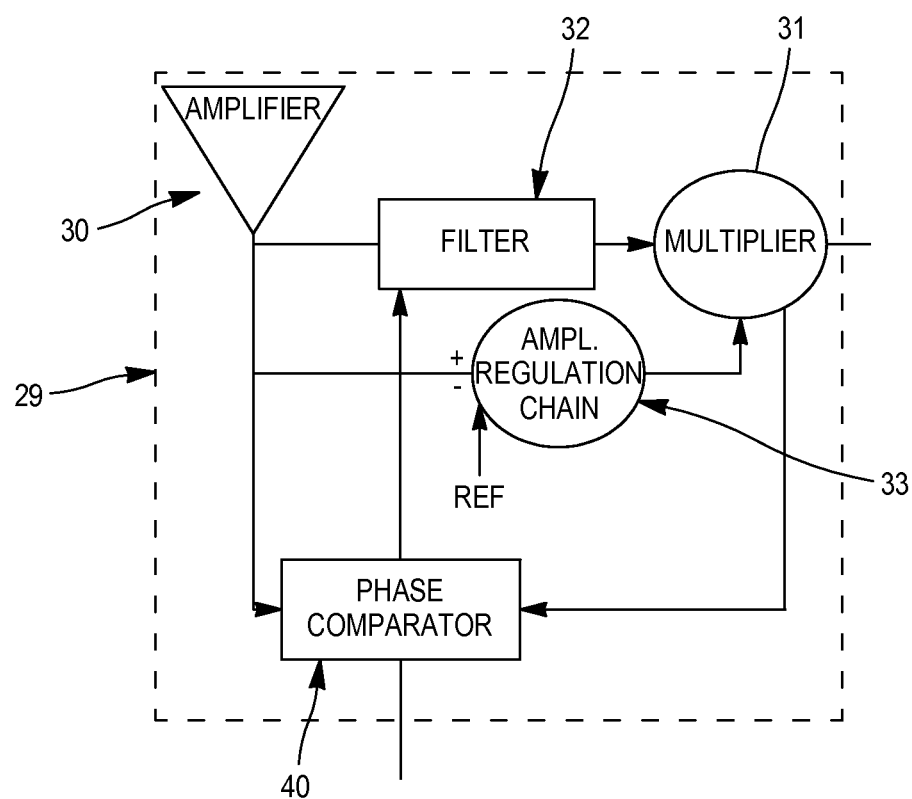
FIG. 8A is an enlarged block diagram of the slave excitation circuit 29 of the embodiment of the control and processing illustrated in FIG. 8.
Figure 8B:
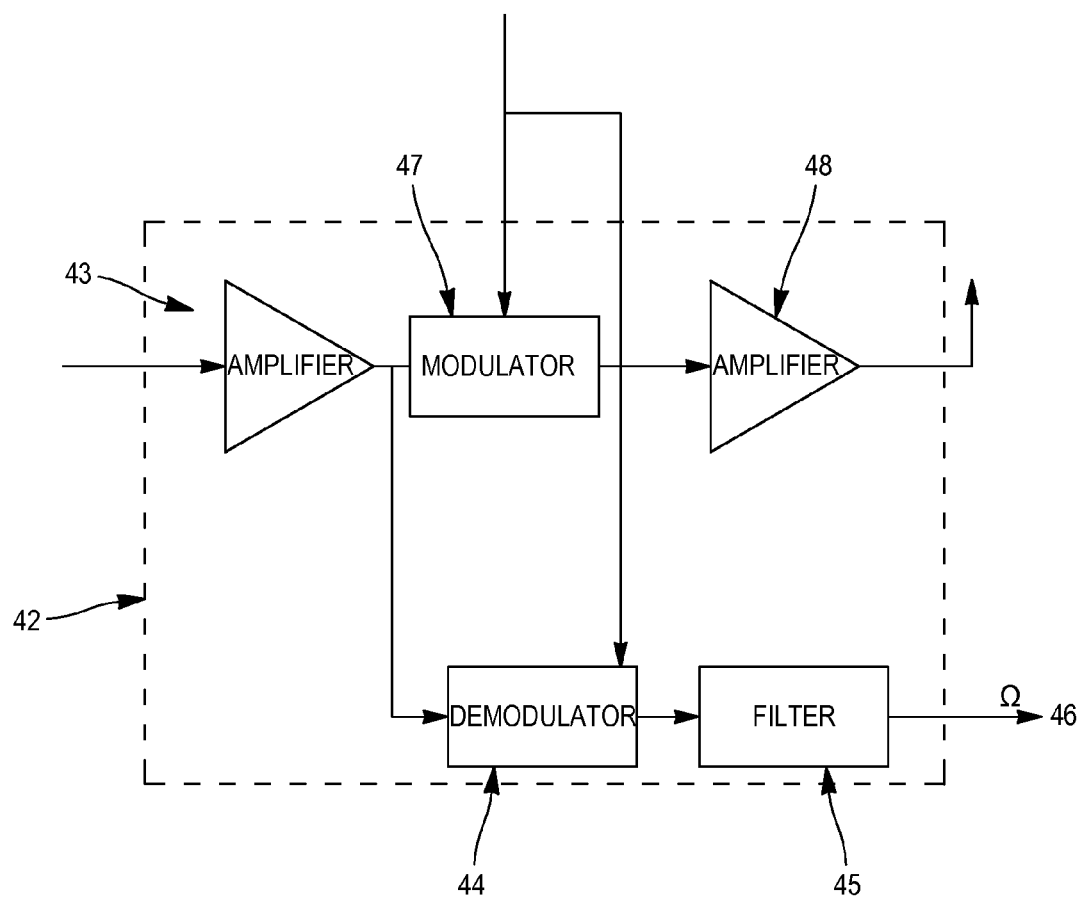
FIG. 8B is an enlarged block diagram of the measuring circuit 42 of the embodiment of the control and processing illustrated in FIG. 8.

Other characteristics, aims and advantages of the invention will emerge from the following description which is purely illustrative and non-limiting and which must be considered with respect to the attached diagrams, in which:

FIG. 1, already commented on, is an illustration of vibration modes of a gyroscope with cylindrical resonator;

FIG. 2, already commented on, is an illustration of vibration modes of a gyroscope with cylindrical resonator;

FIG. 3 is an illustration of an embodiment of a gyroscope according to the invention;

FIG. 4 is an illustration of another embodiment of a gyroscope according to the invention;

FIG. 5 is an illustration of another embodiment of a gyroscope according to the invention;

FIG. 6 is a schematic illustration of steps of a treatment process according to the invention;

FIG. 7 is a schematic illustration of an embodiment of the processing of the vibration according to the invention;

FIG. 8 is an illustration of an embodiment of the control and processing of the vibration of the resonator.

FIG. 3 shows an embodiment of a vibrating gyroscope 1 according to the invention. FIG. 4 shows another embodiment of the gyroscope according to the invention. FIG. 5 shows another embodiment of the gyroscope according to the invention.

It is evident that the invention applies to any vibrating gyroscope comprising a cylindrical resonator, and is not limited to the embodiments of FIG. 2, 3, or 4.

The gyroscope 1 comprises a base 2, which acts as plinth.

The gyroscope 1 also comprises a resonator 3. This resonator 3 comprises a body 4 of generally cylindrical shape terminating in a face 5. To the side opposite the face the body 4 is open.

The face 5 of the resonator 3 has the form of a disc, or a similar form, and has a centre 16.

The resonator 3 is capable of vibrating according to a first vibration mode comprising antinodes distributed on n axes and according to a second vibration mode comprising antinodes distributed on n other axes. The first and the second modes correspond to maximal deformations of the resonator, which are similar though offset at an angle.

The antinodes designate the maxima in amplitude of the vibration modes, that is, the maximum deformation of the resonator 3 relative to its rest state (maximum displacement).

In conventional terms, the antinodes have algebraic amplitude, of a given sign, which evidences contraction of the resonator or else expansion of the resonator. A positive sign of the amplitude of vibration antinodes could for example correspond to expansion of the resonator, whereas a negative sign of the amplitude of vibration antinodes could correspond to contraction of the resonator. Of course, the inverse is feasible and depends on the conventions of selected signs.

For each of the axes of the antinodes of a vibration mode the two antinodes can exhibit amplitudes of the same sign. This is for example the case for elliptical vibration modes (n=2).

More generally, when n is even, the antinodes located on the same axis have amplitudes of the same sign.

On the contrary, when n is uneven, the antinodes located on the same axis have amplitudes of opposite signs.

In general, mode n=2 is used, and this can be elliptical vibration modes, in which the axes of the antinodes of each mode are orthogonal to one another.

The gyroscope comprises a plurality of piezoelectric assemblies $E_i$, each comprising at least two piezoelectric elements 23, 24 arranged in contact with the face 5 of the resonator 3.

At least one of the piezoelectric elements 23 of each piezoelectric assembly is capable of exciting the resonator 3 in vibration and at least one of the piezoelectric elements 24 of the piezoelectric assembly is capable of detecting vibrations of the resonator 3.

The face 5 of the resonator 3 comprises on each axis of the first and of the second vibration mode two piezoelectric assemblies $E_i$, each piezoelectric assembly Ei at the same time comprising at least one piezoelectric element 23 capable of exciting the resonator in vibration and at least one piezoelectric element 24 capable of detecting vibrations of the resonator.

In the event where n=2 the resonator 3 is capable of vibrating according to a first vibration mode comprising antinodes distributed on two axes (x,y), and a second vibration mode comprising antinodes distributed on two other axes $(x_1, y_1)$, the face 5 of the resonator 3 comprising on each axis of the first and of the second vibration modes two piezoelectric assemblies $E_i$, each piezoelectric assembly Ei at the same time comprising at least one piezoelectric element 23 capable of exciting the resonator in vibration and at least one piezoelectric element 24 capable of detecting vibrations of the resonator.

This finally produces at least sixteen piezoelectric elements.

Advantageously, exactly sixteen piezoelectric elements are used, that is, eight assemblies of two piezoelectric elements, arranged as explained hereinabove.

It is possible of course to have more than eight piezoelectric assemblies.

In general, each piezoelectric assembly $E_i$ can comprise more than two piezoelectric elements 23, 24.

In general, the piezoelectric assemblies Ei are arranged on each axis of the first and of the second vibration modes, on either side of the centre 16 of the face 5 of the resonator.

Advantageously, the piezoelectric assemblies $E_i$ are arranged over the circumference of the face.

In general, the elements 23, 24 are arranged adjacently for each piezoelectric assembly $E_i$, with however a space between said zones. The piezoelectric elements 23, 24 of the same assembly are therefore distinct, but arranged near each other.

However, it is possible that there is no space between the elements, which can therefore form zones of the same piezoelectric element, each of the zones being dedicated to detection or excitation.

Advantageously, the piezoelectric elements 23 capable of exciting the resonator in vibration are arranged uniformly over the circumference of the face, and the piezoelectric elements 24 capable of detecting vibrations of the resonator are arranged uniformly over the circumference of the face.

Advantageously, the piezoelectric elements 23, 24 are arranged uniformly, especially on concentric circles, the circle of the detection elements 23 having a radius of value different to the circle of the excitation elements 24.

In general, the piezoelectric elements are pellets which are rectangular and metallised on their two faces, one being adhered or brazed onto the face of the resonator which constitutes the electric earth.

For example, it is known to use lead titanium zirconate as piezoelectric material.

In an advantageous embodiment, the piezoelectric elements are polarised, which avoids the use of inverters and/or subtractors in the excitation and vibration-measuring circuits, as explained later.

This is highly advantageous for rejecting parasite modes appearing in the resonator, and multiplying the vibration-measuring and control points, as explained later.

The gyroscope 1 conventionally comprises a certain number of vibration control and processing modules 18, described later. These modules 18 conduct the excitation in vibration of the resonator and measure/treat said excitation.

In the particular embodiment of FIG. 3, the face 5 of the cylinder is distal, to the side opposite the base 2.

The face 5 is particular in that it comprises at least one through hole 13. In the embodiment of FIG. 3, the face 5 comprises a plurality of through holes 13.

In this embodiment, the control and processing modules of the vibration are arranged at least in part in the base 2. In general, these modules 18 are arranged on an electronic control card integrated in the lower part of the base 2, and covered by a protective cap.

The gyroscope 1 has at least one electric connection 15, passing through the interior of the body 4 of the resonator 3 through said hole 13, and electrically connecting said modules 18 of the base 2 to the plurality of piezoelectric elements 23, 24, for controlling and measuring vibration of the resonator 3. This connection 15 could be relayed by an interconnection card 20, acting as interface between the connection 15 and the piezoelectric elements 23, 24.

As it is evident, this configuration creates a highly compact gyroscope, since the electrical connections between the control and measuring modules 18 and the piezoelectric elements 23, 24 are made via the interior of the body of the resonator 3, via at least one dedicated hole 13 of the face 5 of the resonator 3 opposite the base 2.

Advantageously, the face 5 comprises a plurality of through holes 13 arranged on its circumference, as illustrated in FIG. 3.

In this case, the gyroscope 1 also comprises a plurality of electrical connections 15 passing through at least one subassembly of said holes 13, for the electrical connection of the modules 18 of the base 2 and the plurality of piezoelectric elements 23, 24.

The rest of the holes can be used for the entry of mechanical links, for example rods 22 serving to mechanically link the interconnection card 20 with the base 2.

Advantageously, the holes 13 are arranged substantially uniformly over the circumference of the face 5, that is, with regular or quasi-regular angular offset.

In this case, it is advantageous to place the piezoelectric elements 23, 24 of the piezoelectric assemblies $E_i$ between said openings.

Advantageously, the holes 13 are shaped as a disc made in the face 5 of the resonator described earlier.

Advantageously, the resonator comprises a central opening arranged at the centre of the face 5 and prolonged by a linking foot 21 between the resonator 3 and the base 2. This linking foot can have various functions and especially serve as mechanical link between the resonator and the base, and/or allow passage for electrical connections between the modules of the base and the piezoelectric elements. The foot is arranged inside the body the resonator.

Advantageously, the base 2 comprises a recess of shape complementary to the foot 21, and capable of receiving the linking foot 21 to mechanically join the resonator and the base.

In general, the gyroscope 1 comprises an interconnection card 20 connecting the plurality of electrical connection 15 and being connected to the piezoelectric elements 23, 24.

This interconnection card 20 is used for transmission of information or commands sent by the control and processing modules 18 to the piezoelectric elements, or vice versa.

In general, the gyroscope also comprises a protective cap, not shown, for retaining the vacuum created later under said cap and covering the assembly comprising the resonator and the base. The cap is for example a bell or a cylinder.

In an embodiment illustrated in FIG. 4, the face 5 comprises a central hole 13. The resonator also comprises a linking foot 21 between the resonator 3 and the base 2, arranged at the level of the extension of the central hole 13.

The foot 21 allows at least one electrical connection 15 to pass through, thus connecting the vibration control and processing modules 18 arranged in the base 2 and the piezoelectric elements 23, 24. The foot 21 likewise acts as mechanical linking between the resonator 3 and the base 2, especially by way of its complementary form with a recess of the base 2.

This embodiment produces a highly compact gyroscope.

It is likewise possible to provide additional holes 13 in the face 5, as mentioned earlier.

In the embodiment of FIG. 5, the face 5 of the resonator 3 is proximal, arranged of the side of the base 2, and comprises one or more through holes 13, such as described previously.

The piezoelectric elements 23, 24 can be arranged on the face 5, to the side turned to the base 2, or to the side turned to the exterior of the resonator 3.

Advantageously, the piezoelectric elements 23, 24 of the assemblies $E_i$ are arranged between the holes.

The openings themselves can be arranged uniformly over the circumference of the face of the resonator.

It is evident that the invention is not limited to the gyroscopes of FIGS. 3 to 5 and does not necessarily comprise holes in the face of the cylindrical resonator.

In conventional terms, the gyroscope 1 comprises a protective cap covering the assembly comprising the resonator and the base. In general, production of the gyroscope comprises a degassing step, and a step of vacuum sealing via the protective cap covering the assembly.

In general, the vibration control and processing modules 18 are adapted to maintain vibration of the resonator and for measuring the vibrations caused in the resonator, in cooperation with the piezoelectric elements 23, 24 of the piezoelectric assemblies Ei. Most often they comprise one or more electric signal generators, and electric modules such as amplifiers, filters, multipliers, adders, subtractors or the like.

The modules 18 are adapted to process the measured signal to deduce therefrom an angle of rotation and/or a speed of rotation about the axis z of the cylindrical body of the resonator 3.

The modules 18 at the same time constitute a vibration excitation circuit and a detection/processing circuit.

In general, the excitation circuit is closed-loop to give the excitation vibration of the resonator constant amplitude and pulsing equal to the pulsing of the proper mode of vibration.

It is understood that various embodiments of said modules are possible. Different types of execution are possible, for example: open-loop gyrometer mode, closed-loop gyrometer mode, and gyroscope mode.

FIG. 6 shows steps of a treatment process according to the invention, in a gyroscope such as described previously.

As specified previously, the face 5 of the resonator 3 comprises two piezoelectric assemblies $E_i$ on each of the n axes of the antinodes of the first and of the second vibration modes, each piezoelectric assembly $E_i$ at the same time comprising at least one piezoelectric element 23 capable of exciting the resonator in vibration and at least one piezoelectric element 24 capable of detecting vibrations of the resonator.

One step consists of measuring the vibration of the resonator with the piezoelectric elements 24.

Another step consists of combining measurements of said piezoelectric elements 24 to reject parasite vibration modes appearing in the resonator. The combination is made by adding and/or subtraction of measurements.

In particular, the combination of measurements of the piezoelectric elements 24 comprises the step consisting of, for each vibration mode, getting a treated signal equal to the sum of measurements of the piezoelectric elements located on the axes of the antinodes having amplitude of a given sign, minus the sum of measurements of the piezoelectric elements located on the axes of the antinodes having amplitude of a sign opposite the given sign, said signs being defined at any given instant of vibration, said treated signal rejecting parasite vibration modes of the resonator.

The signs of amplitudes of the antinodes are defined at any given instant since the antinodes alternatively exhibit amplitude of opposite sign, as illustrated for example in FIG. 1 for elliptical modes. This is simply a convention of signs defined by the user.

FIG. 7 shows an embodiment of the processing of the vibration of the resonator 3, rejecting parasite vibration modes, in the event of elliptical vibration modes (n=2).

Illustrations (A) and (B) correspond to useful vibration modes used for measuring rotation, whereas illustrations (C) and (D) correspond to parasite vibration modes of the resonator.

The face 5 of the resonator 3 comprises on each axis (x, y, $x_1$, $y_1$) of the first and of the second vibration modes two piezoelectric assemblies (Ei), each piezoelectric assembly ($E_i$) at the same time comprising at least one piezoelectric element 23 capable of exciting the resonator in vibration and at least one piezoelectric element 24 capable of detecting vibrations of the resonator.

A treatment process consists of measuring the vibration of the resonator with the piezoelectric elements 24, and combining the measurements of the piezoelectric elements by adding and/or subtraction, to reject parasite vibration modes appearing in the resonator.

This rejection is carried out at least to the first order. This allows the measurement of the angle or speed of rotation with more precision.

In particular, for each vibration mode a processing step consists of getting a treated signal equal to the sum of measurements of the piezoelectric elements located on the antinodes having amplitude of a given sign, minus the sum of measurements of the piezoelectric elements located on the antinodes having amplitude of a sign opposite the given sign, said treated signal rejecting parasite vibration modes of the resonator.

For example, this processing can consist of the following mathematical operation in which the treated signal is equal to the measurement of the piezoelectric element 24 of the assembly E1, plus the measurement of the piezoelectric element 24 of the assembly E5, minus the measurement of the piezoelectric element 24 of the assembly E3, minus the measurement of the piezoelectric element 24 of the assembly E7.

It is apparent that the signs of amplitudes of the antinodes have been defined relative to the instant of vibration in which the antinodes according to the axis x correspond to expansion of the resonator. This is not however mandatory.

This combination eliminates the following parasite vibration modes: vibration mode (C), so-called flexion mode, and vibration mode (D), so-called drum mode. In fact, as is easily understood from FIG. 7, the combination of measurements of the piezoelectric elements described just now ends up as a zero signal for the flexion mode and the drum mode.

Similar processing could be adopted for the piezoelectric assemblies arranged on the axes $x_1$, $y_1$ of the second vibration mode.

The treatment process therefore measures the angle of rotation or speed of rotation by filtering parasite vibration modes. It likewise controls vibration by eliminating parasite modes.

Advantageously, the process comprises the step consisting of exciting in vibration the first and/or the second mode via the piezoelectric elements 23 capable of exciting the resonator in vibration arranged on the axes of said mode, said excitation being calibrated from measurements of the piezoelectric elements 24 capable of detecting vibrations of the resonator arranged on said axes of said mode, to perform closed-loop processing.

For example, excitation produced by the piezoelectric elements 23 of the assemblies E1, E3, E5 and E7 could be calibrated from measurements of the piezoelectric elements 24 of said assemblies. Excitation will be calibrated to be close to useful vibration modes. So the excitation elements 23 will excite the resonator with amplitude of sign equal to the sign of the amplitude of the antinodes of the vibration modes, said sign being measured via the detection elements 24 belonging to the corresponding piezoelectric assemblies.

There are therefore:
- four piezoelectric excitation elements 23 for a first vibration mode (x,y);
- four piezoelectric detection elements 24 for a first vibration mode (x,y);
- four piezoelectric excitation elements 23 for a second vibration mode ($x_1, y_1$);
- four piezoelectric detection elements 24 for a second vibration mode ($x_1, y_1$).

Of course, there can be more than four elements for each of the functions described hereinabove. So, each function (excitation/detection) has at least four piezoelectric elements.

The adapted combination of measurements of these elements rejects parasite vibration modes.

FIG. 8 shows an embodiment of control and processing of the vibration of the resonator.

Each of the piezoelectric assemblies Ei at the same time comprises a piezoelectric element 23 capable of exciting the resonator in vibration and a piezoelectric element 24 capable of detecting vibrations of the resonator.

The elements 23, 24 are shaped as rectangular pellets.

Alternatively, the elements 23 and 24 can be made in the form of contiguous zones of a piezoelectric assembly.

The face 5 of the resonator 3 comprises on each axis (x, y, $x_1$, $y_1$) of the first and of the second vibration mode two piezoelectric assemblies ($E_1, E_2, \ldots$), each piezoelectric assembly ($E_1, E_2, \ldots$) at the same time comprising a piezoelectric element 23 capable of exciting the resonator in vibration and at least one piezoelectric element 24 capable of detecting vibrations of the resonator.

Here there are therefore sixteen piezoelectric elements 23, 24, eight in excitation and eight in measurements.

This embodiment rejects parasite vibration modes which might occur in the resonator, something not possible with only eight piezoelectric elements.

The four piezoelectric elements 24a, 24c, 24e and 24g, arranged according to the axes x,y of the antinodes of the first vibration mode, supply output signals each proportional to elongation of the vibration of the resonator and which are combined in a subtractor 28 to supply the input signal of a slave excitation circuit 29 of amplitude and phase.

The circuit shown by way of example comprises an amplifier 30 which attacks a multiplier 31 by way of a filter 32 piloted by a phase regulation chain.

The gain of the multiplier 31 is controlled by the amplitude regulation chain 33 which receives both the output signal of the amplifier 30 and a reference signal REF, representative of the amplitude to be maintained.

The filter 32 (active in general) is controlled for its part by a phase comparator 40 which receives both the output signal of the amplifier 30 and also the output signal of the circuit, coming from the multiplier 31. The phase comparator 40 controls the filter 32 so as to maintain the phase difference at a constant value, generally zero.

The output signal of the circuit 29 attacks the piezoelectric elements 23a, 23c, 23e, 23g by way of an inverter 34, inverting the polarity of signals applied to the elements 23c and 23g.

The four piezoelectric elements 24b, 24d, 24f, 24h supply signals which are combined in a subtractor 41 to constitute the input signal of the measuring circuit 42, in closed-loop gyrometer mode.

The circuit 42 can have a constitution of known type.

The circuit illustrated comprises an input amplifier 43 followed by a synchronous demodulator 44 which receives a reference signal constituted by an output signal of the circuit 29.

The demodulated signal is applied to a low-pass filter 45 whereof the output 46 is representative of the angular rotation speed Q. Looping in gyrometer mode is ensured by a link between the output of the amplifier 43 and the piezoelectric elements 23b, 23d, 23f, 23h, by way of a modulator 47, an amplifier 48 and an inverter 49 inverting the polarity of the signals applied to the elements 23d and 23h.

The subtractors 28 and 41 and inverters 34 and 49 can be dispensed by appropriately orienting the polarisation vectors of the piezoelectric pellets 23, 24 relative to each other.

The invention rejects parasite vibration modes which may occur in the resonator. These are parasite modes such as flexion mode or drum mode, illustrated in FIG. 2.

As indicated earlier, the invention may have numerous variant embodiments, especially related to the constitution of the control and processing modules 18 linked to the mechanical resonator.

The person skilled in the art understands that the vibration control and processing modules 18 just now described are not limiting for the invention, and that various implementations and variants are possible.

As the person skilled in the art can understand, the gyroscope according to the invention is more efficient than gyroscopes of the prior art.

The invention claimed is:

1. A vibrating gyroscope comprising:
    a base comprising vibration control and processing modules; and a resonator comprising a body of generally cylindrical shape terminating in a face, the resonator being capable of vibrating according to a first vibration mode comprising antinodes distributed on n axes, and a second vibration mode comprising antinodes distributed on n other axes,
    wherein the face of the resonator comprises on each axis of the first and of the second vibration modes two piezoelectric assemblies ($E_i$),
    each piezoelectric assembly ($E_i$) comprising at least one piezoelectric element capable of exciting the resonator in vibration and at least one piezoelectric element capable of detecting vibration of the resonator at the same time, and
    said face of the resonator further comprises a plurality of through holes for connecting the piezoelectric assemblies ($E_i$) to said vibration control and processing modules.

2. The gyroscope as claimed in claim 1, wherein said resonator is capable of vibrating according to a first vibration mode comprising antinodes distributed on two axes (x,y), and a second vibration mode comprising antinodes distributed on two other axes ($x_1,y_1$), the face of said resonator comprising on each axis of the first and of the second vibration modes, two piezoelectric assemblies ($E_i$), each piezoelectric assembly ($E_i$) at the same time comprising at least one piezoelectric element capable of exciting said resonator in vibration and at least one piezoelectric element capable of detecting vibration of the resonator.

3. The gyroscope as claimed in claim 1, wherein said piezoelectric assemblies ($E_i$) are arranged on each axis of the first and of the second vibration modes on either side of a centre of the face of the resonator.

4. The gyroscope as claimed in claim 2, wherein said piezoelectric assemblies ($E_i$) are arranged on each axis of the first and of the second vibration modes on either side of a centre of the face of said resonator.

5. The gyroscope as claimed in claim 1, wherein each said assembly comprises two piezoelectric elements, a piezoelectric element capable of exciting said resonator in vibration and a piezoelectric element capable of detecting vibration of said resonator.

6. The gyroscope as claimed in claim 2, wherein each said assembly comprises two piezoelectric elements, a piezoelectric element capable of exciting said resonator in vibration and a piezoelectric element capable of detecting vibration of said resonator.

7. The gyroscope as claimed in claim 3, wherein each said assembly comprises two piezoelectric elements, a piezoelectric element capable of exciting said resonator in vibration and a piezoelectric element capable of detecting vibration of said resonator.

8. The gyroscope as claimed in claim 1, wherein,
said piezoelectric elements capable of exciting said resonator in vibration are arranged uniformly over a circumference of the face, and
said piezoelectric elements capable of detecting vibration of said resonator are arranged uniformly over the circumference of the face.

9. The gyroscope as claimed in claim 2, wherein,
said piezoelectric elements capable of exciting said resonator in vibration are arranged uniformly over a circumference of the face, and
said piezoelectric elements capable of detecting vibration of said resonator are arranged uniformly over the circumference of the face.

10. The gyroscope as claimed in claim 3, wherein,
said piezoelectric elements capable of exciting said resonator in vibration are arranged uniformly over a circumference of the face, and
said piezoelectric elements capable of detecting vibration of said resonator are arranged uniformly over the circumference of the face.

11. The gyroscope as claimed in claim 5, wherein,
said piezoelectric elements capable of exciting said resonator in vibration are arranged uniformly over a circumference of the face, and
said piezoelectric elements capable of detecting vibration of said resonator are arranged uniformly over the circumference of the face.

12. The gyroscope as claimed in claim 1, wherein said piezoelectric elements of each assembly comprise distinct elements and/or zones of the same piezoelectric element.

13. The gyroscope as claimed in claim 1,
wherein an electrical connection passes through one of the plurality of through holes to connect one or more of said vibration control and processing modules to one of said piezoelectric elements.

14. The gyroscope as claimed in claim 1, wherein, said through holes are arranged substantially uniformly over a circumference of said face, and said piezoelectric elements are arranged between said through holes.

15. A treatment process in a vibrating gyroscope, wherein the gyroscope comprises:
a base comprising vibration control and processing modules,
a resonator, comprising a body of generally cylindrical shape terminating in a face, the resonator being capable of vibrating according to a first vibration mode comprising antinodes distributed on n axes, and a second vibration mode comprising antinodes distributed on n other axes,
the face of said resonator comprising two piezoelectric assemblies ($E_i$) on each axis of the first and of the second vibration modes,
each piezoelectric assembly ($E_i$) comprising at least one piezoelectric element capable of exciting said resonator in vibration and at least one piezoelectric element capable of detecting vibration of the resonator at the same time,
said face of the resonator further comprising a plurality of through holes for connecting the piezoelectric assemblies ($E_i$) to side vibration control and processing modules,
said process comprising:
measuring vibration of said resonator with said piezoelectric elements, and
combining the measurements of said piezoelectric elements for rejecting parasite vibration modes appearing in said resonator.

16. The process as claimed in claim 15, wherein said combination of measurements of said piezoelectric elements comprises obtaining for each vibration mode, a treated signal equal to a sum of measurements of the piezoelectric elements located on the antinodes having amplitude of a given sign, minus the sum of measurements of said piezoelectric elements located on the antinodes having amplitude of a sign opposite the given sign, said signs being defined at a given instant of vibration, said treated signal rejecting parasite vibration modes of said resonator.

17. The process as claimed in claim 15, comprising exciting in vibration the first and/or the second modes via said piezoelectric elements capable of exciting said resonator in vibration arranged on the axes of said mode, said excitation being calibrated from one or more measurements of said piezoelectric elements capable of detecting vibration of said resonator arranged on said axes of said mode, to execute a closed-loop processing.

18. The process as claimed in claim 16, comprising exciting in vibration the first and/or the second modes via said piezoelectric elements capable of exciting said resonator in vibration arranged on the axes of said mode, said excitation being calibrated from one or more measurements of said piezoelectric elements capable of detecting vibrations of said resonator arranged on said axes of said mode, to execute a closed-loop processing.

* * * * *